US005085395A

United States Patent [19]

Frater et al.

[11] Patent Number: 5,085,395

[45] Date of Patent: Feb. 4, 1992

[54] EQUIPMENT SECURITY APPARATUS AND KIT

[75] Inventors: Wayne K. Frater; Joseph C. Spitzer, both of San Diego, Calif.

[73] Assignee: Mardesich Enterprises, Inc., San Diego, Calif.

[21] Appl. No.: 492,737

[22] Filed: Mar. 13, 1990

[51] Int. Cl.[5] .......... F16M 13/00

[52] U.S. Cl. .......... 248/552; 248/205.3; 70/58

[58] Field of Search .......... 70/57, 58, 232; 248/499, 500, 503, 505, 551-553, 205.3

[56] References Cited

U.S. PATENT DOCUMENTS

| | | | |
|---|---|---|---|
| 3,850,392 | 11/1974 | Gassaway | 70/232 X |
| 3,945,227 | 3/1976 | Reiland | 70/58 |
| 4,353,521 | 10/1982 | Webb | 70/58 X |
| 4,453,692 | 6/1984 | LeDoux et al. | 70/58 |
| 4,473,176 | 9/1984 | Harper | 70/58 |
| 4,585,202 | 4/1986 | Parsekian | 248/553 |
| 4,634,009 | 1/1987 | Gassaway | 70/57 |
| 4,691,891 | 9/1987 | Dionne | 248/205.3 X |
| 4,696,449 | 9/1987 | Woo et al. | 248/553 |
| 4,733,840 | 3/1988 | D'Amore | 248/205.3 |
| 4,884,420 | 12/1989 | Finkel et al. | 70/58 |

*Primary Examiner*—Gary L. Smith

*Assistant Examiner*—Suzanne L. Dino

*Attorney, Agent, or Firm*—Bernard L. Kleinke; Jerry R. Potts; William Patrick Waters

[57] ABSTRACT

The security apparatus and kit, as well as the method of using them, includes a security device or cradle for receiving and restraining equipment, to be protected. Adhesive material extends along and is affixed to a substantial portion of the underside of the device, and forms a bond to the upper surface of a supporting surface. A restraining arrangement of the device surrounds a portion of the portable equipment to be secured, which includes a lockable arm which moves between an opened and a closed position to permit the equipment to be received and retained lockably within the device, and yet be readily unlocked and opened by authorized personnel. In order to remove the security cradle from a supporting surface once it has been bonded adhesively thereto, a dispenser of releasing agent cools the adhesive material to disable temporarily its adhesive bond, and permit the apparatus to be bonded subsequently to another surface. The kit further includes a tool having a tapered end to facilitate the lifting of the security device by insertion under the equipment in an unbonded space adjacent to the end of the adhesive material once the securing bond of the adhesive material has been temporarily disabled.

10 Claims, 1 Drawing Sheet

EQUIPMENT SECURITY APPARATUS AND KIT

DESCRIPTION

1. Technical Field

The present invention relates in general to equipment security apparatus and kit, as well as a method of using them. More particularly, the invention relates to such security apparatus kit for securing removably table top equipment, such as computers, printers, typewriters, and others, to a supporting surface for preventing the unauthorized removal therefrom.

2. Background Art

There have been many different types and kinds of equipment security devices used to prevent the unauthorized removal of portable equipment, such as personal computers, typewriters and the like from a supporting surface. For example, reference may be made to the following U.S. Pat. Nos. 3,850,392; 4,065,083; 4,655,429; 4,691,891; and 4,733,840.

While the apparatus and methods disclosed in the foregoing patents may have been satisfactory for some applications, it has been difficult, if not impossible, to secure removably a security device to a supporting surface, without an undesirable modification of the supporting surface. For example, attachment techniques have included drilling holes through the supporting surface to receive bolts, cables and the like fastening devices to secure the equipment to the supporting surface. Even though such techniques may have been convenient to use, many business establishments have been reluctant to cause permanent damage to expensive secretarial and executive desks, credenzas and the like furniture.

Therefore, it would be highly desirable to have a new and improved technique for securing removably equipment to be protected to a supporting surface in an easy and convenient manner without the necessity of damaging or otherwise modifying the supporting surface for the equipment.

In an attempt to overcome the above-mentioned problems, the foregoing mentioned U.S. Pat. No. 4,691,891 discloses a security device, which uses a high bonding adhesive tape to attach the equipment to the supporting surface, thereby eliminating the need to drill holes, or otherwise to modify the supporting surface. However, in order to remove the patented device from the supporting surface by authorized personnel, it is necessary to apply a solvent such as acetone or lighter fluid to the bonding area to weaken the adhesive bond of the material to remove the equipment from the supporting surface. Such action, could damage the surface, either by the solvent destroying the finish on the surface, or by the surface being gouged or otherwise marred by prying the device therefrom.

Moreover, it would be difficult, if not impossible, to apply a sufficient quantity of the solvent to the adhesive strips to weaken its bonding strength sufficiently for removal purposes, since only the side edges are exposed. Thus, the patented technique teaches an awkward and difficult technique for the removal of the security device from the supporting surface. Moreover, once the security device is removed from the supporting surface, the adhesive material may be sufficiently weakened so that the security device could not be readily re-installed at a new location.

Moreover, the patented security device fits under the equipment to be protected, and is a two-part device having a bottom part bonded to the supporting surface, and a top part bonded to the underside of the equipment. In this regard, in order to permit the equipment to be removed from its supporting surface, while maintaining the bottom part bonded to the supporting surface, a set of security screws fastening the parts together, can be removed by authorized personnel, to free the top part fastened to the equipment. However, it is difficult and awkward for the authorized person to gain access to the security screws under the equipment. Also, such screws may be removed with conventional special tools so that an unauthorized person may also remove the screws.

Therefore, it would be highly desirable to have a new and improved technique for securing removably equipment to be protected, without the need for altering or modifying the supporting surface. Once installed, the equipment should be able to be removed by authorized personnel in a convenient manner, for repair or replacement thereof. Also, the security device itself should be readily and conveniently removable from its supporting surface, without the danger of damaging the surface or the security apparatus. Moreover, such security apparatus, once removed, should readily and immediately be able to be relocated by authorized persons to a different supporting surface, and used again without the necessity of providing new adhesive material, or any other modifications to the security apparatus.

DISCLOSURE OF INVENTION

Therefore, the principal object of the present invention is to provide a new and improved security apparatus and kit, as well as a method of using same, for securing removable equipment to be protected to a supporting surface in an easy and convenient manner without the necessity of modifying it, and which can be removed therefrom in a convenient manner by authorized persons only.

Another object of the present invention is to provide such a new and improved security apparatus and kit, and method of using same, wherein the security apparatus itself can be removed from a supporting surface by authorized persons without substantial damage to the supporting surface.

It is another object of the present invention to provide such a new and improved security apparatus and kit, as well as a method of using same, wherein after removing the security device by authorized persons, the security apparatus can be immediately relocated at another supporting surface and attached thereto in a convenient manner, without replacing any of the parts of the security apparatus.

Briefly, the above and further objects of the present invention are realized by providing an equipment security apparatus and kit, and method of use thereof, whereby an authorized person can easily and conveniently bond in a secure manner equipment to be protected to a supporting surface such as a desk top, without drilling holes for receiving anchoring bolts and the like. The kit and the method of using the kit further permits an authorized person to deactivate the bonding agent used to attach the equipment to its supporting surface, and then permit it to be re-activated at another supporting surface, without the need to change parts, or otherwise modify the security apparatus. The transfer can be made in a fast and efficient manner.

The security apparatus and kit, as well as the method of using them, includes a security device or cradle for receiving and restraining equipment, to be protected. Adhesive material extends along and is affixed to a substantial portion of the underside of the device, and forms a bond to the upper surface of a supporting surface. A restraining arrangement of the device surrounds a portion of the portable equipment to be secured, which includes a lockable arm which moves between an opened and a closed position to permit the equipment to be received and retained lockably within the device, and yet be readily unlocked and opened by authorized personnel.

In order to remove the security cradle from a supporting surface once it has been bonded adhesively thereto, a dispenser of releasing agent is used to lower the temperature of the adhesive material to disable temporarily its adhesive bond. The kit further incudes a tool having a tapered end to facilitate the lifting of the security device by insertion under the equipment in an unbonded space adjacent to the end of the adhesive material. The tool thus helps facilitate the lifting equipment from the supporting surface once the securing bond of the adhesive material has been temporarily disabled.

The method of using the kit includes placing the securing surface of the security cradle or device on a firm supporting surface, and then manually and forcibly pressing the base of the cradle against and into engagement with the supporting surface. After the security cradle has been secured to the supporting surface, equipment to be protected, such as a personal computer is placed within the security cradle between a pair of generally upright perpendicular restraining arms. In this regard, the power cable as well as any other control cables attached to the portable equipment, are routed through a cable guard disposed on one end of the security cradle to protect against unauthorized removal of the cable. The portable equipment is then moved rearwardly between the restraining arms toward the cable guard, until the connectors of the portable device pass under the cable guard and the rearward portion of the portable device rests firmly against the face of the cable guard. The base of the portable device is then lowered into the base of the cradle with the cables of the portable device being disposed within the interior space of the cable guard. With the cables disposed within the interior space of the cable guard, the power cord and control cables may not be physically removed from the portable device, by unauthorized persons thus, providing a further degree of security.

To lock the portable device within the security cradle, an authorized person swings the locking arm of the restraining arrangement so that the locking arm is disposed between the restraining arms and directly over the equipment to be protected, to prevent it from being lifted out of the security cradle. Once the locking arm has been so positioned, a conventional lock, such as a paddle lock, is utilized to secure the locking arm to the restraining arm, thus preventing the equipment to be protected from being removed from the security cradle by unauthorized persons.

It should be understood that the base of the security cradle is generally complementary shaped relative to the base or bottom portion of the equipment to be protected. In this regard, when the equipment is received within the base of the cradle, the equipment is captured therein. Thus, once the locking arm has been locked in place, the equipment becomes secured within the security cradle.

In order to relocate the security cradle to a new locale, a user unlocks the lock, swings the locking arm into its opened position, to permit the equipment to be removed from the cradle. After removing the equipment, a releasing agent under pressure is sprayed on top of the now exposed base, under which the adhesive material is disposed. The releasing agent is a coolant, such as liquid nitrogen, to cool the base, which is composed of a thermally conductive material thus, in turn, the entire adhesive material on the underside of the base is cooled, to deactivate its adhesive bond.

As the temperature of the adhesive material decreases, it temporarily loses its adhesive bonding ability. Thus, an authorized person can easily place the lifting tool under the base, and then press downwardly on the tool handle to lift the security cradle away readily and conveniently from the supporting surface, to free the cradle therefrom.

Thus, it should be understood that the locking arm is readily accessible on top of the unit, and thus no awkward manipulations are required by the authorized personnel, to free the equipment from the cradle.

Once the security cradle has been removed from the supporting surface, it can be transported to a new location. Once the security cradle has been relocated on top of another supporting surface, the adhesive bond is again formed, after the temperature of the adhesive material rises sufficiently toward ambient temperatures.

Thus, it should be noted that substantially the entire adhesive material can be cooled, since the coolant spray is directed toward the upper surface of the thermally conductive base, and not to the exposed side edges of the material.

BRIEF DESCRIPTION OF DRAWINGS

The above mentioned and other objects and features of this invention and the manner of attaining them will become apparent, and the invention itself will be best understood by reference to the following description of embodiments of the invention in conjunction with the accompanying drawings, wherein.

BEST MODE FOR CARRYING OUT THE INVENTION

Figure 1:
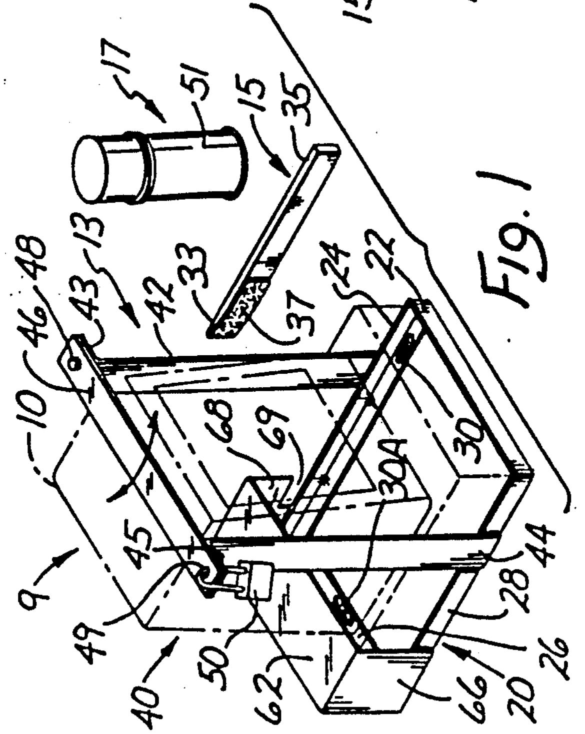
FIG. 1 is a pictorial view illustrating operative elements of an equipment security apparatus and kit, which are constructed in accordance with the present invention, and which shows equipment to be protected in broken lines.
Figure 2:
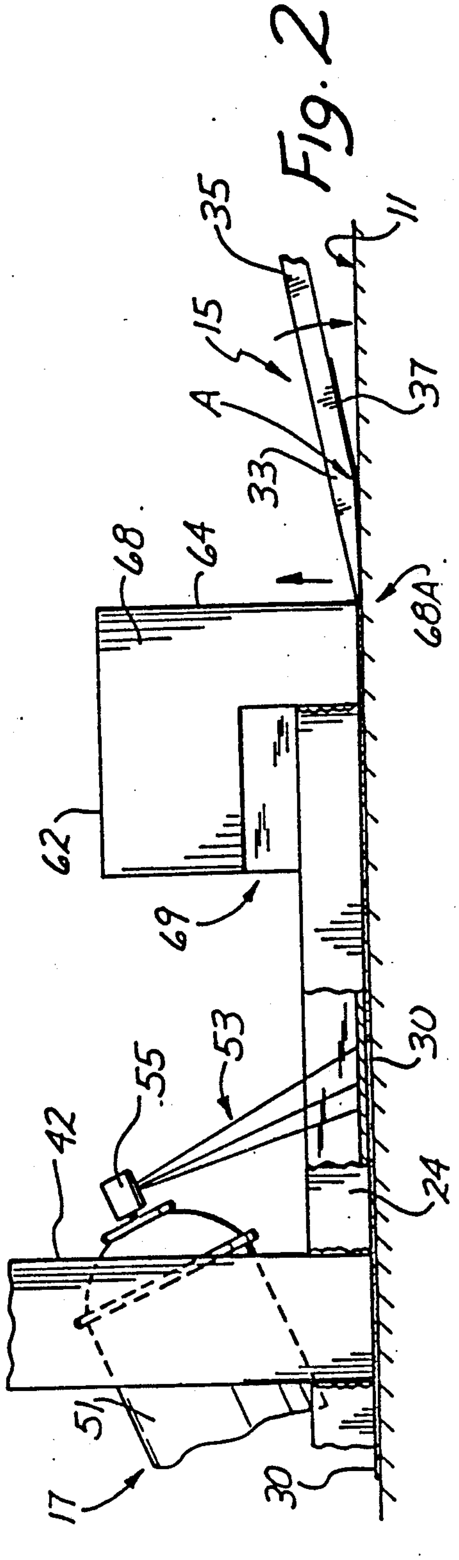
FIG. 2 is an enlarged fragmentary side elevational view of the kit of FIG. 1, illustrating the releasing of the security apparatus.

Referring now to the drawings, and more particularly to FIGS. 1 and 2 thereof, there is shown a security apparatus and kit, 9, which is constructed in accordance with the present invention. The kit 9 is used according to the method of the present invention, to secure removably to a firm supporting surface 11, equipment 10 to be protected. The equipment 10 is indicated by broken lines in FIG. 1 to be a personal computer, but it is to be understood that other types and kinds of equipment may also be protected. For example, typewriters, printers, facsimile machines, and others, can also be protected by the method and apparatus of the present invention.

The supporting surface 11 may be a conventional desk top, table top, or any other convenient surface for supporting the equipment 10 from below.

The security apparatus and kit 9 generally comprises a security apparatus or cradle generally indicated at 13, for bonding the equipment 10 to a supporting surface, a releasing agent dispenser 17 for helping deactivate the bond temporarily and a cradle removal tool 15 for helping to lift the cradel 13 from its supporting surface once the bonding agent has been temporarily disabled. The security cradle 13 receives and restrains the equipment 10, and is bonded to the supporting surface 11 (FIG. 2), so that the equipment 10, may not be removed from the supporting surface, by unauthorized persons.

Considering now the security cradle 13 in greater detail with reference to FIG. 1, the security cradle 13 generally comprises a rectangular open base frame 20, which is complementarily shaped and dimensioned to receive the entire bottom portion of the equipment 10. The base frame 20 includes a set of four elongated frame members 22, 24, 26 and 28, which are each generally L-shaped in cross section throughout their lengths. A set of four strips of adhesive material, such as strips 30 and 30A, extend along substantially the undersides of the entire length of each of the frame members, such as the frame members 24 and 26, which are shown broken away to expose the perspective strips 30 and 30A on the undersides thereof. The remaining two frame members 22 and 28 are each provided with like strips (not shown) on their undersides. Peel-off protective tapes (not shown) normally cover the strip of adhesive material and is peelable therefrom to expose the securing surfaces of the strips for adhesion to the supporting surface 11.

An example of a suitable strips of adhesive material for use with the security cradle 13, is a double sided tape, which is sold under the trademark SCOTCH, product 4945 by 3M Canada, Inc and which can be cut into the desired strips of adhesive material, for use as the strips, such as the strips 30 and 30A. The preferred adhesive material is thermally activated, and forms a tenacious bond at room temperatures. However, it deactivates at sufficiently cold temperatures.

As best seen in FIG. 2, the strip 30 affixed to the underside of the long frame member 24, and a like strip (not shown) affixed to the underside of the other long frame member 28, are spaced from the ends of their respective frame members. In FIG. 2, the strip 30 terminates at its rear end spaced at a distance from the rear end of its frame member 24, to define an unbonded space to receive the tip end of the removal took 15, as hereinafter described in greater detail, to facilitate the cradle removal operation.

As shown in FIG. 1, the security cradle 13 also includes a generally U-shaped restraining assembly 40 for securing removably the equipment 10 within the cradle 13. The restraining assembly 40 generally comprises a pair of parallel spaced-apart elongated restraining posts or upright members 42 and 44 fixed at their bottom ends to frame members 24 and 28 respectively, to receive the equipment 10 therebetween. A locking arm 46 extends across the top ends of the posts 42 and 44, in a locking position, to secure the equipment 10 in place. A cable guard 60 is disposed at the rear end of the base 20 to help prevent cables (not shown) from being removed by unauthorized persons from equipment 10.

Frame members 42 and 44 terminate in outwardly arms or flanges 43 , 45 to support the transverse locking arm 46 extending thereacross. Arm 46 is pivotally mounted to the arm 43 by a pivot pin or bolt 48, and is pivotally freely rotatable about a 360 degree axis of rotation about the pin or bolt 48 in a horizontal plane.

As shown in FIG. 1, the restraining posts 43 and 45 are adapted to be connected together by the locking arm 46 which may be extended between the two restraining posts 43 and 45 in the locking position. In order to lock the locking arm 46 to the restraining post 45 as shown in FIG. 1, both the restraining post 45 and the locking arm 46 include aligned openings, such as opening 49 in the arm 46, for receiving the shank of a conventional lock 50.

As best seen in FIGS. 1 and 2, the cable guard 60 helps prevent the power and control cables (not shown) attached to the equipment 10 from being disconnected when it is disposed within the cradle 13. The cable guard 60 is integrally connected to frame members 24, 26 and 28, respectively. The cable guard 60 is in the form of a housing, which receives a portion of the equipment 10. The guard 60 is generally of a unitary construction having a top plate 62, a back plate 64, and a pair of side plates 66 and 68. Side plate 68 includes a cut out portion shown generally at 69, which defines an opening for permitting the equipment cables (not shown) to extend therethrough. In this regard, when the equipment 10 is disposed in the security cradle 13, the cable guard 60 completely surrounds the connectors (not shown) so that the cables attached to the equipment connectors cannot be removed by unauthorized persons.

Considering now the tool 15 in greater detail with reference to FIGS. 1 and 2, the removal tool 15 is generally an elongated paddle or bar having a tapered tip portion 33 and a handle portion 35. The tool 15 is generally rectangular in cross section throughout its length, and is composed of suitable rigid thermally conductive material, such as metal, Steel is preferred. The tip portion 33 includes upper surface 34 and a lower surface 36 and is tapered at a small acute angle relative to the upper surface 34. The lower surface 36 of the tip portion 33 and part of the handle portion 35 is covered with a soft resilient cushioning material 37 such as rubber to help prevent the supporting surface 11 from being gouged or otherwise damaged or marred when the tool 15 is used to lift the security cradle 13 from the surface 11.

Considering now the releasing agent dispenser 17 in greater detail with reference to FIGS. 1 and 2, the dispenser 17 generally comprises a container 51 which is filled with a suitable releasing agent under pressure, shown generally at 53 (FIG. 2) for disabling temporarily the adhesive bond of the adhesive material 30 to the supporting surface. The dispenser 17 includes a conventional spray nozzle 55 to permit the releasing agent 53 to be dispersed uniformly across the upper surface of the members 22, 24, 26 and 28, forming the cradle base. The members are each composed of a thermally conductive material, such as metal. Aluminum is preferred.

Thus, the adhesive material on the undersides of the members 22, 24, 26 and 28 are thus cooled, when the members are cooled by the coolant 53 sprayed on their upper surfaces. The adhesive bonds formed by the adhesive materials are released, when the temperature of the materials decreases sufficiently. The bonding ability of the materials is thereby deactivated to permit the cradle to be removed from its supporting surface. The bond is deactivated for a sufficient period of time, such as 30 minutes, to permit the cradle to be placed on another supporting surface.

After that period of time, the temperature of the adhesive materials rises toward the ambient temperatures, and the bond becomes re-established tenaciously to the new supporting surface.

An example of a suitable releasing agent for use with dispenser, is a cooling agent, such as Freon 12, in the form of a freeze mist or a releasing agent, sold under the trade name NEUTRABOND.

Considering now the use of the kit 9 in greater detail with reference to FIGS. 1 and 2, as indicated in FIG. 1, a security cradle 13 is initially removably secured to the supporting surface 11 by an authorized person placing the underside of the security cradle 13 against the supporting surface 11 so that the strips of adhesive material, such as strips 30 and 30A come into contact against the surface 11. The user then manually presses the base 20 against the supporting surface 11, thus permitting the adhesive material to grip tenaciously the supporting surface 11.

Once the security cradle 13 has been attached to the supporting surface 11, an authorized person unlocks the lock 50, removes the lock 50 from the security cradle 13, and swings in the direction of the curved arrows, the locking arm 44 of the restraining arrangement 40 about the pin 48 to a position 90 degrees from its locked position extending transversely across the posts 42 and 44 thus, allowing the equipment 10 to be lowered between the restraining posts 42 and 44 and into resting engagement within the base frame 20. In this regard, it should be understood that the cables (not shown) attached to the equipment 10 is first inserted through the opening 69. The equipment 10 is then tilted backwardly in a counter-clockwise direction so that the connectors (not shown) on the back of the equipment 10 can pass under the top plate 62. Once the connectors are disposed below the top plate 62, the equipment 10 can be returned to its upright position and then lowered into the base frame 20. Subsequently, the locking arm 46 is pivotally rotated 90 degrees back to its original locking position as shown in FIG. 1. After the locking arm is positioned between the posts 43 and 45, the shank of lock 50 is inserted through the aligned openings in arms 43 and 45 and secured; thus, locking the equipment 10 within the security cradle 13.

In order to secure the equipment 10 in a different location, the lock 50 is unlocked and removed from the security cradle 13. After lock 50 is removed, the locking arm 46 is swung horizontally through about 90 degrees about pin 48, to permit the equipment to be removed from the cradle 13. A person then lifts the equipment upwardly until the connectors thereof engage the top plate 62 of the cable guard 60. When the connectors engage the top plate 62, the person rotates the equipment 10 backwardly in a counter-clockwise direction and then lifts it upwardly and forwardly away from the cable guard 60 until the connectors are freed from beneath the top plate 60. Once the connectors are disposed outside of the cable guard 60, the person removes the cables from the opening 69 and completely removes the equipment 10 from the security cradle 13.

Subsequently, as shown in FIG. 2, when the equipment 10 has been removed from the security cradle 13, the person dispenses the releasing agent 53 from the dispenser 17 by pressing manually the nozzle 55 and pointing the nozzle 55 toward upper surface of the frame member 24 to cool it and thus causing the adhesive material, such as material 30 and 30A disposed on the underside thereof to deactivate the adhesive bond between the security cradle 13 and the supporting surface 11. The releasing agent 53 when sprayed onto the member 24, causes the adhesive material, such as material 30 and 30A to cool rapidly and thus lower its temperature to a temperature where its bond becomes deactivated temporarily. With the adhesive material temporarily disabled, a person can easily lift the security cradle 13 from the supporting surface 11.

To help the person in lifting the security cradle 13 from the supporting surface 11, the person inserts the tip of the lifting tool 15 under the end of the frame member 24 of the frame 20 as shown in FIG. 2 by holding the tool 15 by its handle 35, and aligning the tool longitudinally with the frame member 24. The tip of the tool 15 is inserted into an unbonded space shown generally at 68A between the end of the adhesive strip 30 and the end of the member 24.

After placing the tool 15 under the frame 20, the person presses downwardly on the handle 35 to enable the tip portion 33 of the tool 15 to rock about its fulcrum point upwardly, shown generally at A, thus lifting one end of the frame member 24 of the security cradle 13 from the supporting surface 11.

The tool 15 is then used in a similar manner to free the base frame member 28. In this regard, the two long frame members 24 and 28 are first freed, because the entire base then becomes dislodged from its supporting surface 11.

The security cradle 13 is then lifted from the supporting surface 11, and the exposed portion of the adhesive strips may then be covered with a protective tape (not shown), thus permitting the person to grasp the underside of the frame 20. The person grasps the underside of the frame 20, and the person lifts and rotates the frame 20 backwardly in a counter-clockwise direction until the entire securing strips of adhesive material have been disengaged from the supporting surface 11.

After the security cradle 13 has been lifted from the supporting surface 11, the remaining portions of the exposed securing surface may be similarly covered with protective tape (not shown). The security cradle 13 may then be transported by conventional means (not shown) to a new location and reinstalled as described above. In this regard, it should be understood that the adhesive material would be restored to room temperature and would once again regain its full bonding strength so that it can be secured to a new supporting surface (not shown) with the same bonding strength when it was originally bonded to supporting surface 11.

Figure 3:
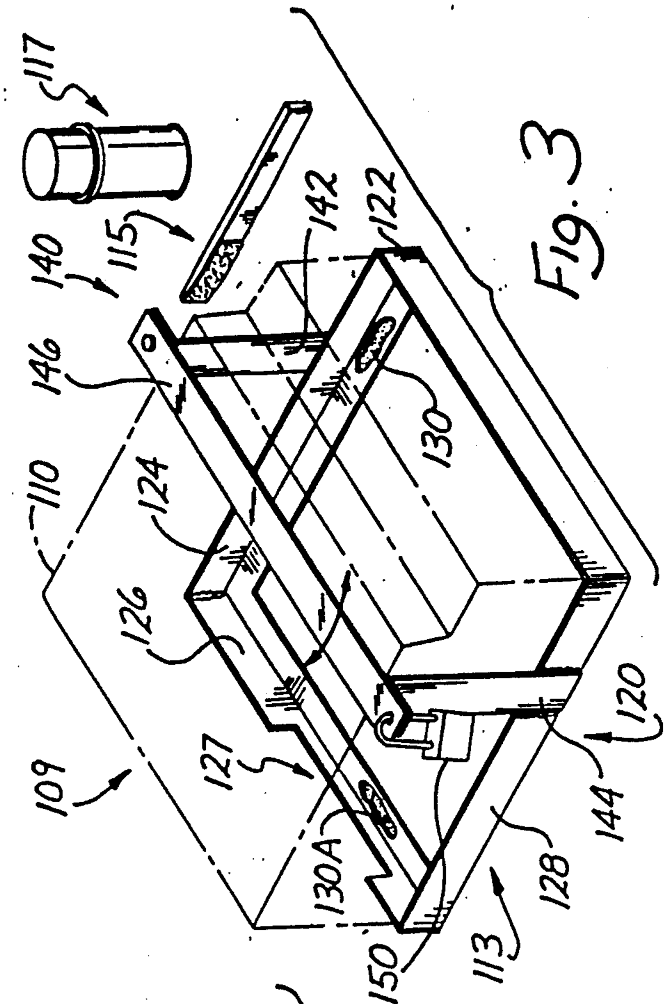
FIG. 3 is a p view illustrating operative elements of another equipment security apparatus and kit, which are also constructed in accordance with the present invention, and which shows equipment to be protected in broken lines.

Another form of a security apparatus and kit 109 is shown in FIG. 3. The security apparatus and kit 109 includes a security apparatus or cradle generally indicated at 113 for bonding a portable equipment device 110 to a supporting surface (not shown), a cradle removal tool 115 and a releasing agent dispenser 117 for storage of a releasing agent (not shown) to help deactivate the bond temporarily. The lifting tool 115 is substantially identical to tool 15 and will not be described in further detail. Similarly the dispenser 117 as its stored releasing agent is substantially similar to dispenser 27 and releasing agent 53 and thus will not be described in greater detail.

Considering now the security cradle 113 in greater detail with reference to FIG. 3, the security cradle 113 generally comprises a rectangular open base frame 120, and a integrally connected U-shaped restraining frame 140. The base frame 120 is complimentary shaped and dimensioned to receive the entire bottom portion of the equipment 110. The base frame 120 includes a set of four elongated frames members 122, 124, 126 and 128, which are each generally L-shaped in cross section throughout their lengths. A set of four strips of adhesive material, such as 130 and 130A extend along the underside of substantially the entire length of each of the frame numbers, such as the frame members 124 and 126 which are shown broken away to expose the respective strips 130 and 130A on the underside thereof. The remaining two frame members 122 and 128 are each provided with like strips (not shown) on their underside. Peel-off protective tapes (not shown) cover the strips of adhesive material and is peelable therefrom to expose the securing surfaces of the strips for adhesion to the supporting surface. The adhesive material 130 and 130A is substantially identical to material 30 and 30A and will not be described in greater detail.

As shown in FIG. 3, the security cradle 113 also includes a generally U-shaped restraining assembly 140 for securing removably the equipment 110 within the security cradle 113. The restraining assembly 140 generally comprises a pair of parallel spaced-apart elongated restraining posts or upright members 142 and 144 fixed at their bottom ends to the frame members 124 and 128 respectively to receive the equipment 110 therebetween. Locking arm 146 extends across the top ends of the posts 142 and 144 in a blocking position to secure the equipment 10 in place. The restraining posts 142 and 144 and the locking arm 146 are substantially identical to posts 42, 44 and arm 46 respectively and are locked together by a lock 150 as shown in FIG. 3.

Considering now the base frame 120 in greater detail with respect to FIG. 1, the frame members 122, 124 and 128 are substantially identical to frame members 22, 24 and 28. In this regard only frame member 126 will be described hereafter in greater detail.

Considering now frame member 126 in greater detail with reference to FIG. 3, frame member 126 is composed of L-shaped channel iron and includes a cut out portion shown generally at 127. The cut out portion 127 is disposed nearer the frame member 128 than frame member 124 and is positioned so as to accommodate the connectors (not shown) of the equipment 110. In this regard, when the bottom portion of equipment 110 is lowered into the frame 120, the connectors of the equipment 110 will align with the cut out portion 127 and will extend therethrough.

Considering now the use of the security apparatus kit 109 in greater detail with reference to FIG. 3, the kit 109 is used in substantially the same manner as kit 9 as previously described herein. It should be noted, however, that since the security cradle 113 does not include a cable guard, the equipment 110 may be lowered directly into the base frame 120 without the necessity of rotating the device 110 backward in a counterwise direction to permit the connectors to pass under a top plate as previously described with reference to kit 9.

It should also be understood that because the security cradle 113 does not include a cable guard, it would be possible for a thief to remove and take the cables connected to the device 110.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A security kit for attaching equipment to be protected to a supporting surface, comprising:

cradel means for receiving and retaining the equipment in a fixed position;

said cradle means including base means being composed of a thermally conductive material and being adapted to receive the bottom of the equipment;

adhesive means secured to the underside of said base means of said cradle means for forming an adhesive bond removably between said cradle means and the supporting surface;

cooling means adapted to be applied to an upper surface of said base means with the equipment removed for cooling it and said adhesive means disposed thereunder to disable temporarily adhesive bonds to permit and authorized person to remove the cradle means from said supporting surface, whereby said cradle means may be relocated to a new location and adhesively secured to another supporting surface; and wherein the cooling means is a gaseous substance.

2. A security kit according to claim 1 wherein said cradle means includes locking means for securing removably the portable equipment within said cradle means.

3. A security kit according to claim 1 wherein said cradle means includes cable guard means for preventing cable means secured removably to the portable equipment from being removed.

4. A security kit according to claim 2 wherein said locking means includes a U-shaped frame having a pivotally connected locking arm for securing the equipment within said cradle means.

5. A security kit according to claim 4 wherein said locking means further includes a lock for securing the locking arm in a fixed position to prevent the portable equipment from being removed from the security device.

6. A security kit according to claim 1 wherein the adhesive means is a double sided adhesive tape, one side of said tape being secured to said cradle means and the other side of said tape being secured to the supporting surface.

7. A security kit according to claim 1 wherein the gaseous substance is a freezing mist.

8. A security kit according to claim 1 wherein the gaseous substance is freon.

9. A security apparatus in accordance with claim 1 wherein said cradle means includes:

a pair of upstanding posts affixed to said base means disposed on opposite sides of the equipment; and a lockable arm mounted swingable to one of said arms for swinging between opened and closed positions, said arm being lockable in its closed position and permitting the equipment to be removed when in its opened position.

10. A security apparatus according to claim 9, further including a cable guard affixed to said base means.

* * * * *

UNITED STATES PATENT AND TRADEMARK OFFICE
CERTIFICATE OF CORRECTION

PATENT NO. : 5,085,395

DATED : February 4, 1992

INVENTOR(S) : Wayne F. Frater; Joseph C. Spitzer

It is certified that error appears in the above-identified patent and that said Letters Patent is hereby corrected as shown below:

Column 5, Line 13, before "13", delete "cradel" and substitute therefor --cradle--.

Column 10, Line 11, before "means", delete "cradel" and substitute therefor --cradle--.

Signed and Sealed this

Twenty-sixth Day of April, 1994

*Attest:*

Bruce Lehman

BRUCE LEHMAN

*Attesting Officer*

*Commissioner of Patents and Trademarks*